July 13, 1926. 1,592,328
J. E. BECKMAN
TRANSMISSION GEARING
Filed Oct. 25, 1923 6 Sheets-Sheet 3

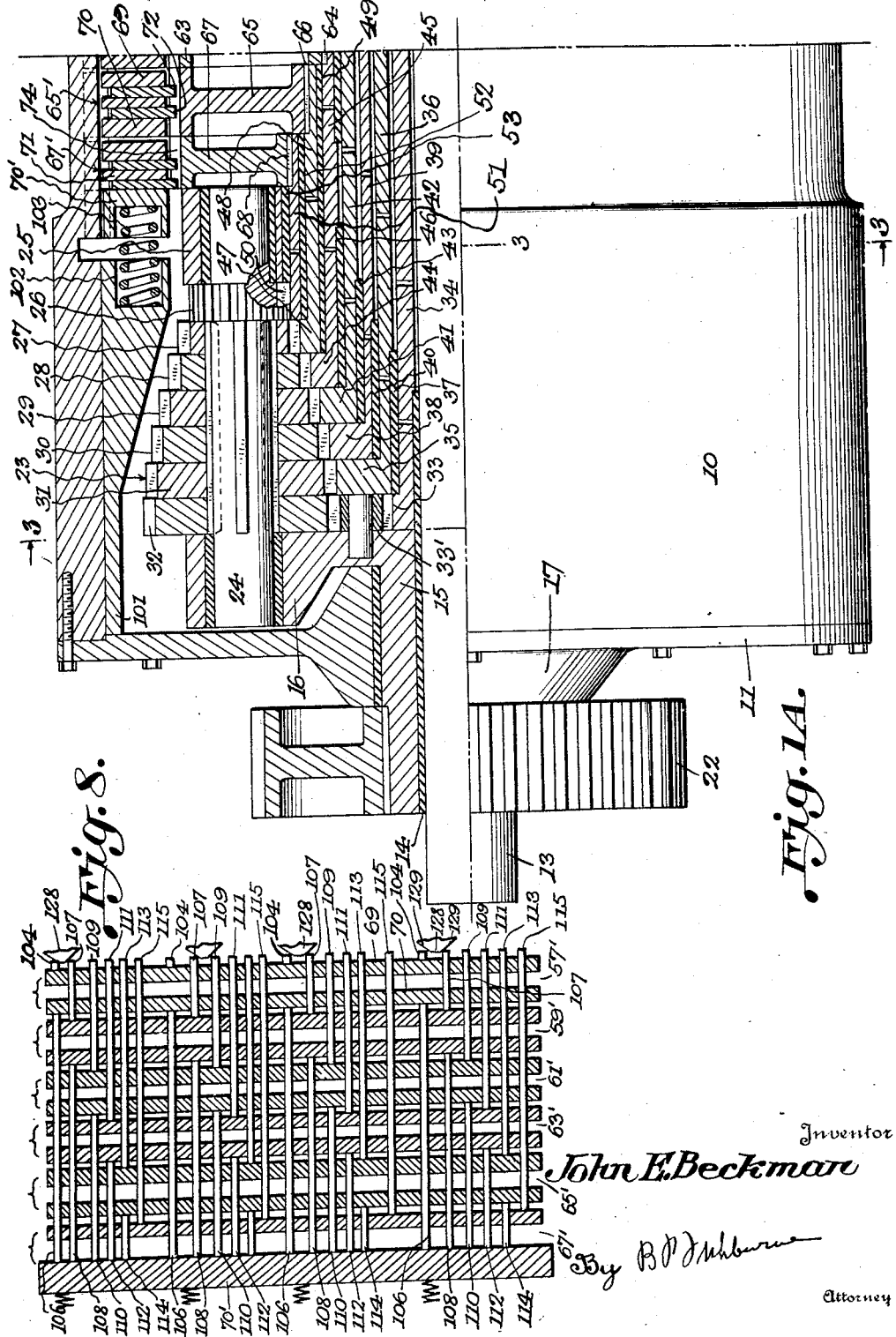

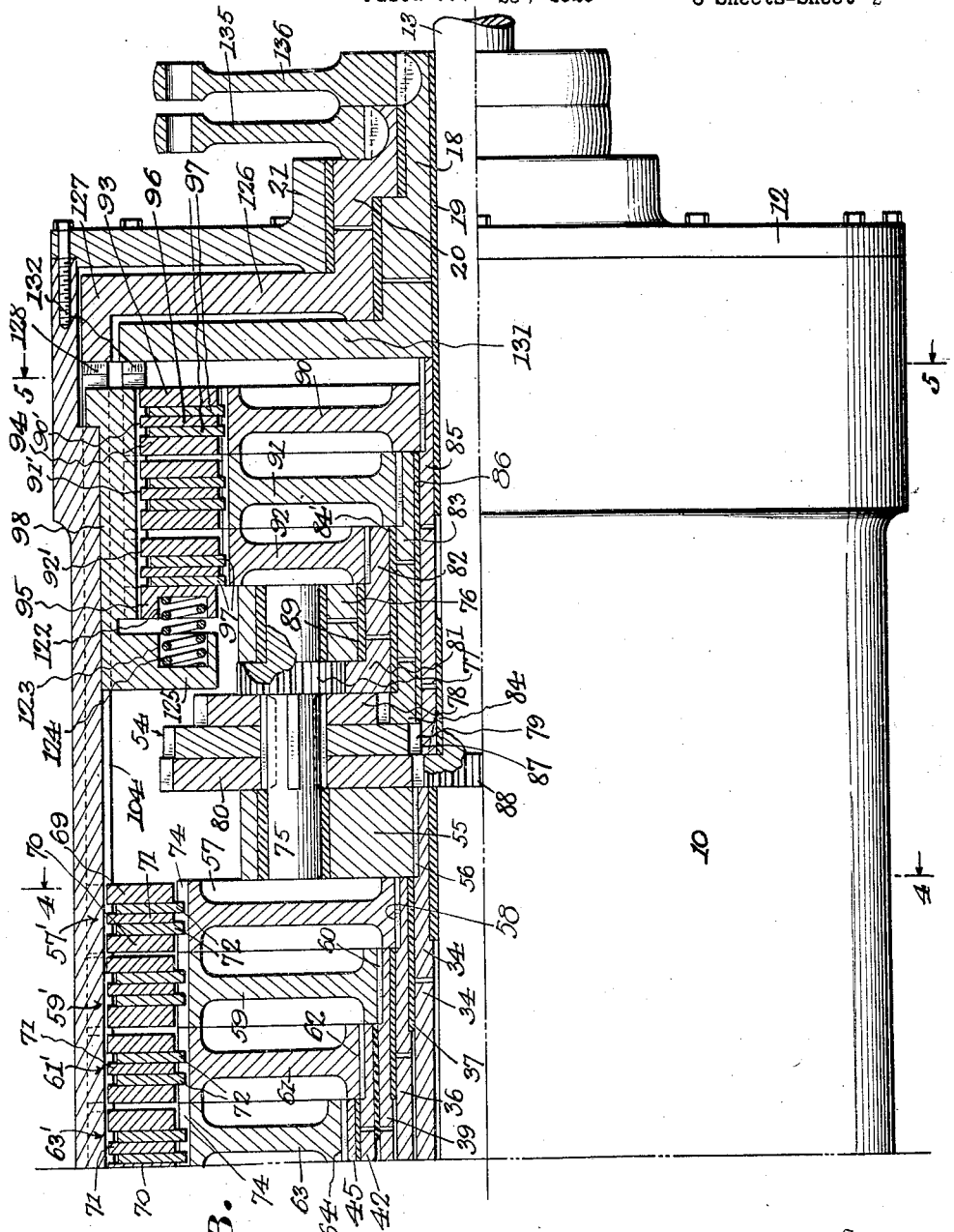

Inventor
John E. Beckman

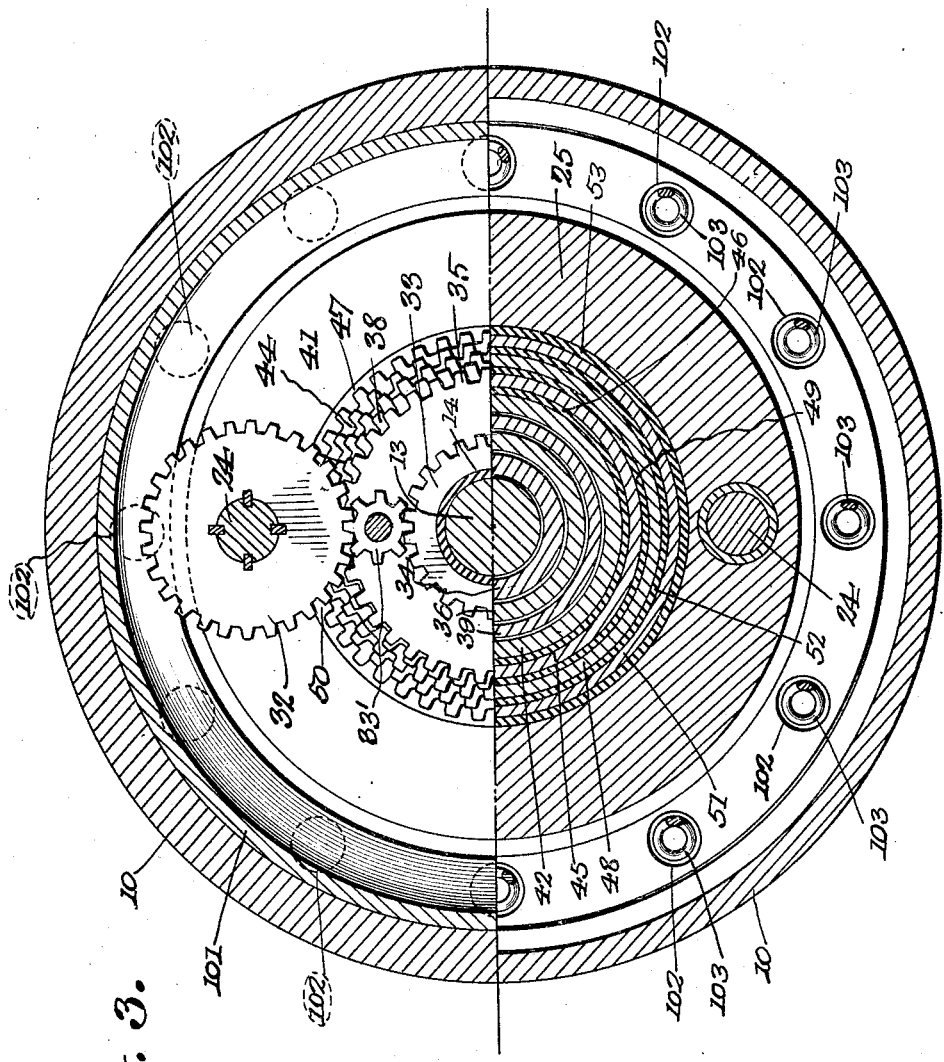

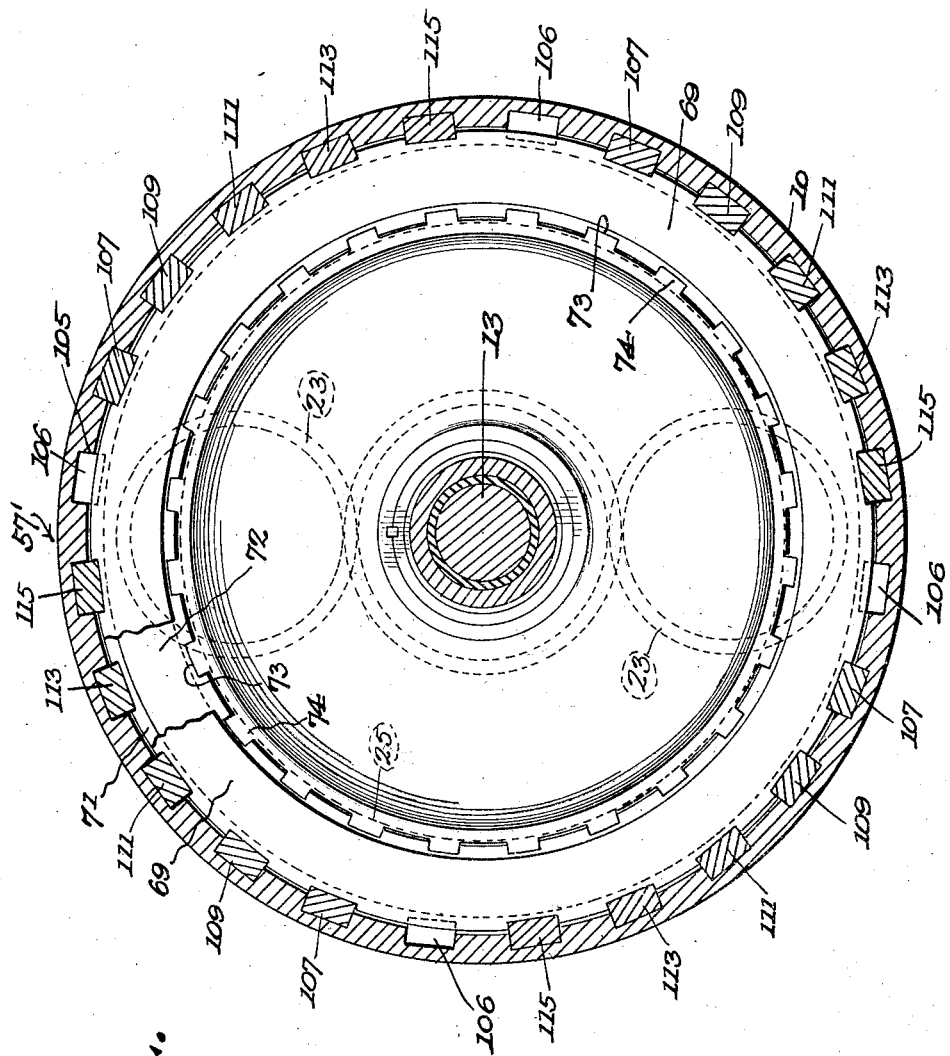

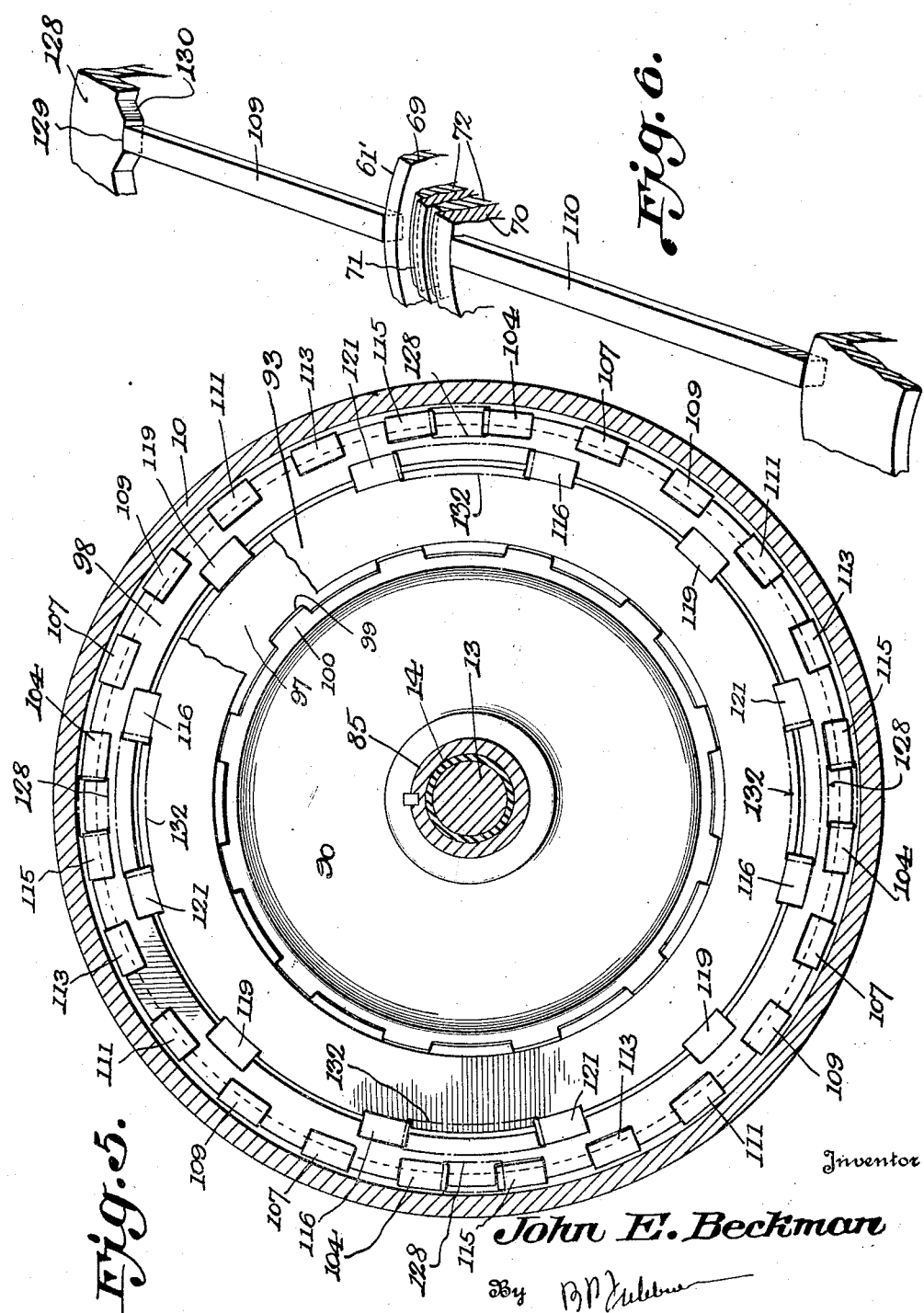

Patented July 13, 1926.

1,592,328

UNITED STATES PATENT OFFICE.

JOHN E. BECKMAN, OF DETROIT, MICHIGAN.

TRANSMISSION GEARING.

Application filed October 25, 1923. Serial No. 670,773.

My invention relates to improvements in variable speed transmission gearing.

An important object of the invention is to provide gearing of the above mentioned character, so constructed that a large range of speed adjustments is obtainable, with a positive and reliable drive.

A further object of the invention is to provide gearing of the above mentioned character which may be readily controlled by the operator, from one point.

A further object of the invention is to provide gearing of the above mentioned character, which may be used in automobiles, or with various types of machinery, where a large number of different driving speeds is desired.

Other objects and advantages of the invention will be apparent during the course of the following description.

In the accompanying drawings forming a part of this specification, and in which like numerals are employed to designate like parts throughout the same, Figure 1$^A$ is a side elevation, with the upper half, in central longitudinal vertical section, of transmission gearing embodying my invention, Figure 1$^B$ is a similar view of the rear portion of the gearing, forming a continuation of Figure 1$^A$, Figure 2 is an end elevation of the gearing, Figure 3 is a transverse section taken on line 3—3 of Figure 1$^A$, Figure 4 is a similar view taken on line 4—4 of Figure 1$^B$, Figure 5 is a similar view taken on line 5—5 of Figure 1$^B$, Figure 6 is a perspective view of a push rod and support rod, and associated elements, Figure 7 is a diagrammatic view showing the sets of friction clutch devices and associated elements, in the rear unit, and, Figure 8 is a similar view of the friction clutch devices and associated elements in the forward unit.

In the drawings, wherein for the purpose of illustration is shown a preferred embodiment of my invention, the numeral 10 designates a stationary casing, which is preferably cylindrical, and may be supported in any suitable manner. The forward end of this casing is closed by a head 11, bolted thereto, while its rear end is closed by a head 12, secured thereto in a similar manner.

Extending longitudinally through the casing 10, in concentric relation, is a rotatable driving shaft or element 13. The forward portion of this shaft 13 is journaled in a sleeve bearing or bushing 14 arranged within the tubular hub 15 of a planetary carrier 16. The tubular hub is journaled within a bearing 17 formed upon the head 11. The rear end of the shaft 13 is journaled within a tubular hub 18, to be more fully described. This tubular hub is equipped with a bearing sleeve or bushing 19. The tubular hub 18 is in turn journaled within an outer tubular hub 20, which in turn is journaled in a bearing 21, formed upon the head 12. The purpose of the hub 20 will be more fully explained. It is apparent that the shaft 13 is suitably supported for rotation, and for the purpose of illustration, it will be considered that this shaft is driven from its forward or left end, although it may be driven from either end, if desired.

The numeral 22 designates a driven element, which is keyed or rigidly mounted upon the outer end of the tubular head 15. This gear is employed to transmit the selected speed to the parts to be driven.

In the forward end of the casing 10 is positioned the forward differential gearing unit, designated as a whole by the numeral 23. This unit embodies the planetary carrier 16, which is preferably cylindrical and is provided at diametrically opposite points with openings for rotatably receiving a pair of stub-shafts 24. The rear ends of these stub shafts are journaled within openings formed in the annular planetary carrier 25, which is supported in a manner to be described. The stub-shafts 24 are each equipped with a plurality of gears of different diameters, which gears are indicated by the numerals 26, 27, 28, 29, 30, 31 and 32. These gears preferably increase in diameter to the left. The gear 26 is preferably formed integral with its stub-shaft 24 while the gears 27 to 32 are keyed thereon. All of these gears therefore rotate as a unit with the stub-shaft. These gears therefore constitute stepped planetary gears. The planetary gears 32 are in permanent mesh with intermediate or reverse gears 33′, pivoted upon the carrier 16, and in permanent mesh with a sun-gear 33, rotatable upon the shaft 13 and having a long tubular hub 34, preferably integral therewith. The invention is not necessarily restricted to the location of this intermediate or reverse gear as associated with the planetary gear 32, as it may be associated with the other planetary gears in the same unit, or may even be arranged in the rear unit. The invention is also not restricted to the use of this intermediate gear, as it may be dispensed with and the planetary gear 32 engaged directly with the sun-gear 33. This hub extends rearwardly, for a purpose to be explained. The planetary gears 31 are in permanent mesh with a sun-gear 35, of larger diameter than the sun-gear 34 and disposed in concentric relation thereto, at its rear. This sun-gear 35 has a long tubular hub 36, preferably integral therewith, and this hub is rotatable about the tubular hub 34, with sleeves or bushings 37 arranged therebetween. The planetary gears 30 are in permanent mesh with sun-gears 38, of larger diameter than the sun-gear 35, and disposed in concentric relation thereto, at its rear. The sun-gear 38 has a long tubular hub 39, preferably integral therewith, extending rearwardly, as shown. The tubular hub 39 is rotatable upon the tubular hub 36 and bearing sleeves or bushings 40 are arranged between these parts, as shown. The planetary gears 29 are in permanent mesh with a sun-gear 41, having a larger diameter than the sun-gear 38, and equipped with a long tubular hub 42, journaled upon the tubular hub 39, with sleeves or bushings 43, therebetween, as shown. The planetary gears 28 are in permanent mesh with a sun-gear 44, the gear being of larger diameter than the sun-gear 41, and arranged in concentric relation thereto at its rear. The sun-gear 44 has a long tubular hub 45, integral therewith, which is rotatable upon the tubular hub 42, with bushings 46 arranged therebetween. The planetary gear 27 is in permanent mesh with a sun-gear 47, having a larger diameter than the sun-gear 44, and arranged in the rear thereof in concentric relation. This sun-gear 47 is integral with a long tubular hub 48, rotatable upon the tubular hub 45, with bushings 49 between these parts. The planetary gears 26 are in permanent mesh with an annular gear 50, formed upon the forward end of a tubular hub of element 51, and constitute in effect a sun-gear. The tubular hub 51 is rotatable upon the tubular hub 48, with a bushing 52 therebetween, as shown. The annular planetary carrier 25 is rotatable upon the tubular hub 51, with a bushing 53 therebetween.

As clearly shown in Figure 1ᴮ, the numeral 54 designates a rear differential unit, as a whole. This unit embodies a cylindrical planetary carrier 55, which is rigidly mounted or keyed upon the rear end of the tubular hub 34, as indicated at 56. A disk wheel 57 is rigidly mounted or keyed to the rear end of the tubular hub 36, as shown at 58. A disk wheel 59 is rigidly mounted upon the rear end of the tubular hub 39, as shown at 60. A disk or wheel 61 is rigidly mounted or keyed to the rear end of the tubular hub 42, as shown at 62. A disk or wheel 63, is keyed or mounted upon the rear end of the tubular hub 45, as shown at 64. A disk or wheel 65 is rigidly mounted or keyed upon the rear end of the tubular hub 48, as shown at 66. A disk or wheel 67 is rigidly mounted or keyed to the rear end of the tubular hub 51 as shown at 68. It is thus seen that a disk, embodied in a friction clutch device, to be described, is connected with each of the sun-gears, excepting the forward sun-gear 33.

A friction clutch device 57' is associated with the disk 57; a friction clutch device 59' with the disk 59; a friction clutch device 61' with the disk 61; a friction clutch device 63' with the disk 63; a friction clutch device 65' with the disk 65, and a friction clutch device 67' with the disk 67. As these friction clutch devices are similar, except for the arrangement of the notches therein, it is thought that a detail description of one will suffice for all. Each friction clutch device embodies a rear compress ring 69, and a support ring 70, excepting the device 67', having a main support ring 70'. The rings 69 and 70, and in the device 67', ring 70', are splined to the interior of the casing 10, by means of the combined push rods and splines and support rods and splines, to be described. The inner edge of these rings 69, 70, and 70' are spaced from the corresponding disk, and do not engage therewith. Arranged between each pair of rings 69 and 70 and between rings 69 and 70' in the device 67', is an inner friction ring 71, splined to the casing 10, by means of said rods, and free from connection with the corresponding inner disk. Engaging the opposite sides of the inner friction ring 71, between the rings 69 and 70, or 69 and 70', is a pair of outer friction rings 72, the outer edges of which are free from engagement with the splined rods or the casing 10 carrying them. At their inner edges, these outer friction rings 72, see more particularly Figure 4, have notches 73, for receiving extensions or teeth 74, formed upon the corresponding disk. It is thus seen that each of the disks 57 to 67 inclusive, has its periphery splined to the inner edges of the outer friction rings 72. It might be stated that a selected friction clutch device, such as the friction clutch device 57' is actuated to hold the corresponding disk 57 against rotation, and this action is effected by forcing the compress ring 69 forwardly, while yieldingly holding the support ring 70' against forward movement.

The means for effecting this operation will be described hereinafter.

Turning now more particularly to Figure 1ᴮ, I will describe the rear planetary gear unit 54, hereinbefore referred to. This planetary gear unit embodies the cylindrical planetary carrier 55, which is keyed or rigidly mounted upon the tubular hub 34, as explained. The carrier 55 has a pair of diametrically oppositely arranged openings for rotatably receiving a pair of stub-shafts 75, the rear end of which is journaled in an annular planetary carrier 76, rotatably supported, in a manner to be described. The planetary gears 77, 78, 79, and 80 are mounted upon the stub shafts 75 for rotation therewith. These gears are of different diameters, and increase in diameter toward the gear 80. The planetary gears therefore serve in effect as a stepped planetary gear. The planetary gear 77 is preferably integral with the stub-shaft 75, while the other planetary gears mounted thereon, may be keyed to the same. The gear 77 is in permanent mesh with a sun-gear 81, integral with a tubular hub 82, extending rearwardly. This tubular hub is rotatably mounted upon a tubular hub 83, with a sleeve or bushing 84 therebetween. The tubular hub 83 has a sun-gear 84' formed integral with its forward end, and in mesh with the planetary gears 78. The sun-gear 84 is of smaller diameter than the sun-gear 81. The tubular hub 83 is rotatable upon a tubular hub 85, with a bearing or bushing 86 arranged therebetween. This tubular hub carries at its forward end a sun-gear 87, in the form of an annular set of gear teeth. The sun-gear 87 engages the planetary gear 79 and is of smaller diameter than the sun-gear 84. The planetary gear 80 permanently engages a gear 88, rigidly mounted upon the shaft 13. The annular carrier 76 is rotatably mounted upon the tubular hub 82, with the bushing or bearing 89 arranged between these parts. The various tubular hubs are preferably apertured for the passage of lubricant.

The numeral 90 designates a disk, keyed or otherwise rigidly attached to the rear end of the tubular hub 85; 91 a disk keyed or rigidly attached to the rear end of the tubular hub 83; and 92 a disk keyed or rigidly attached to the rear end of the hub 82.

A friction clutch device 90' is associated with the disk 90; a friction clutch device 91' with the disk 91; and a friction clutch device 92' with the disk 92. As these friction clutch devices are similar, it is thought that a detail description of one will suffice.

Each friction clutch device embodies a rear compress ring 93 and a support ring 94. In the clutch device 92' there is a main support ring 95 instead of the support ring 94. Arranged between the forward and rear rings is an inner friction ring 96 and outer friction rings 97, engaging the opposite faces thereof. The inner friction ring 96 is splined to the inner surface of a stationary annular housing 98, in a manner to be described, while its inner edge is free from engagement with the corresponding disk. The inner edges of the friction rings 97 have notches 99, for receiving teeth 100 formed upon the corresponding disk, whereby these parts have a splined connection. The outer edges of the rings 97 are free from engagement with the housing 98 or the rods carried thereby. It might be stated at this point that a selected disk, such as the disk 90, is held against rotation by the actuation of the friction clutch device 90', and this is effected by forcing the ring 93 rearwardly while the ring 95 is yieldingly held against rearward movement.

As more clearly shown in Figure 1ᴬ, the numeral 101 designates an annular housing, which is keyed or otherwise rigidly mounted within the forward end of the casing 10. This housing is provided with a suitable number of pockets or recesses 102, formed in its rear edge, receiving the ends of suitably stiff compressible coil springs 103, the opposite ends of which are seated in pockets formed in the main support ring 70'. This main support ring, in the friction device 67', corresponds to the support ring 70 in the other clutch devices in the same unit.

Considering the friction clutch device 57', the numeral 104 designates a set of combined push rods and splines, arranged rearwardly of the compress ring 69, and engaging the rear face thereof. These push rods 104 are slidable within radially positioned grooves 105, formed in the inner face of the casing 10. These rods also slide in grooves formed in the outer face of the stationary housing 98, which is keyed or rigidly attached to the casing 10. The rear ends of the rods 104 project rearwardly beyond the housing 98, for a purpose to be described. The support ring 70 in the friction clutch device 57' has its rear face engaged by support or thrust rods 106, which serve to hold the same against rearward movement. The support or thrust rods 106 are in alinement with the rods 104 and slide within grooves formed upon the inner face of the casing 10, and also slide within notches formed in the periphery of the rings 69 and 70 of the remaining friction clutch devices, excepting that their extreme rear ends rest against the front face of the main support ring 70'. These support rods serve to spline the other rings 69 and 70 to the inner surfaces of the casing 10. I have shown four of the rods 104 and 106, which are circumferentially spaced within the casing 10.

In connection with the friction clutch devices 59', the numeral 107 designates rods, disposed to the rear of the same, and having their rear ends resting against the rear side of the ring 69. These push rods are slidable within grooves formed in the inner face of the casing 10 and also slidable within notches formed in the outer edges of the rings 69 and 70 of the clutch device 57'. The push rods 107 extend within slots formed in the stationary housing 98 and project rearwardly beyond the same, as shown. Arranged in alinement with the push rods 107 are support or thrust rods 108, arranged in advance of the support ring 70' of the clutch device 59', and contacting with the forward side thereof. The rods 108 are slidable within grooves formed in the inner wall of the casing 10 and also within notches formed in the periphery of the rings 69 and 70 of the other clutch devices, with their rear ends resting against the rear side of the main support ring 70'.

In connection with the clutch devices 61', the numeral 109 designates push rods, arranged rearwardly of the compress ring 69 of the device 61', and bearing against the rear face of this ring. The rods 109 are slidable within grooves formed in the inner face of the casing 10 and also within notches formed in the periphery of the rings 69 and 70, of the devices 57' and 59. These push rods 109 slide within grooves formed in the stationary housing 98 and project rearwardly of the same. Arranged in alinement with the push rods 109 are support thrust rods 110, contacting with the forward face of the support ring 70 of the device 61'. The rods 110 are slidable within grooves formed in the inner surface of the casing 10 and are also slidable within notches formed in the rings 69 and 70, of the clutch devices 63', 65' and 67', with the forward ends of these rods 110 resting against the rear face of the main support ring 70', as shown.

In connection with the friction clutch device 63', the numeral 111 designates push rods, arranged rearwardly of the ring 69 of the device 63', and contacting with the rear face thereof. These rods are slidable within grooves formed in the inner face of the casing 10 and also within notches formed in the rings 69 and 70 of the devices 57', 59' and 61'. These rods are also slidable within notches formed in the housing 98 and extend rearwardly beyond the same. Arranged in alinement with the push rods 111 are support or thrust rods 112, which are disposed in advance of the device 63' and contact with the front side of the ring 70, thereof. These rods 112 are slidable within grooves formed in the inner face of the casing 10 and are also slidable within notches formed in the peripheries of the rings 69 and 70 of the devices 65', and 67', with their rear ends resting against the main thrust ring 70'.

In connection with the friction clutch device 65' are push rods 113, disposed rearwardly of the same with their ends contacting with the rear face of the ring 69'. The rods 113 are slidable within longitudinal grooves formed in the inner face of the casing 10 and are also slidable within notches formed in the peripheries of the rings 69 and 70 of the devices 57', 59', 61' and 63'. The rods 113 are slidable within grooves formed in the housing 98 and extend rearwardly beyond this housing, as shown. Arranged in alinement with the push rods 113 are support or thrust rods 114, disposed forwardly of the device 65, and having their rear ends contacting with the forward face of the ring 70 thereof. The rods 114 are slidable within grooves formed in the inner face of the casing 10 and also within notches formed in the periphery of the ring 69 of the device 67', with their rear ends contacting with the rear face of the main support ring 70'.

In connection with the friction clutch device 67' there are push rods 115, arranged rearwardly of the same. These push rods have their forward ends contacting with the rear face of the ring 69 of the device 67'. The rods 115 are slidable within grooves formed in the inner face of the casing 10 and are also slidable within notches formed in the periphery of the rings 69 and 60 of all of the other devices 57', 59', 61', and 63' and 65'. These rods are also slidable within longitudinal grooves formed in the housing 98 and projecting rearwardly beyond this housing. There are no support or thrust rods in alinement with the rods 115, as the main support ring 70' directly engages the outer friction ring 72 of the device 67'. These rods also pass through notches in the clutch elements or rings 71 and spline them to the casing 10. It is obvious that the several push rods and support rods are circumferentially spaced about the inner surface of the casing 10.

In view of the foregoing description, it will be seen that means are provided whereby the yielding action of the ring 70' is transmitted to the friction rings of each of the friction clutch devices, and also that means is provided whereby the compress ring of each of these devices may be moved forwardly, for bringing the friction rings into proper frictional engagement. The means for moving the push rods forwardly, will be described hereinafter.

I will now describe the push rods and support rods in connection with the friction clutch devices of the rear differential gearing unit 54, and attention is called to Figure 7.

In connection with the friction clutch device 90', the numeral 116 designates push rods, slidable within grooves formed in the inner face of the annular housing 98, which are also slidable within notches formed in the peripheries of the rings 93 and 94 of the device 90′, or in notches formed in the rings 93 and 94 of the rest of the clutch devices. The push rods 116 have shoulders 117 which contact with the rear face of the ring 93. The push rods 116 project rearwardly beyond the housing 98, as shown. Arranged in alinement with the push rods 116 are support or thrust rods 118, slidable within grooves formed in the inner face of the housing 98 and slidable within notches formed in the peripheries of the rings 93 and 94 of the devices 91′ and 92′, with their rear ends resting against the rear face of the main support ring 95.

In connection with the friction clutch device 91′, the numeral 119 designates push rods, arranged rearwardly thereof, with their rear ends engaging the rear face of the ring 93 thereof. The rods 119 are slidable within grooves formed in the inner face of the housing 98 and are also slidable within notches formed in the peripheries of the rings 93 and 94 of the device 90′. The rods 119 project rearwardly beyond the housing 98, as shown. Arranged in alinement with the push rods 119 are thrust or support rods 120, contacting with the forward face of the ring 94 of the device 91′. The rods 120 are slidable within grooves formed in the inner face of the housing 98 and also within notches formed in the periphery of the ring 93 of the device 92′, with their rear ends resting upon the rear face of the main support ring 95.

In connection with the friction clutch device 92′, the numeral 121 designates push rods, arranged rearwardly of the same, and having their rear ends contacting with the rear face of the ring 93 thereof. The rods 121 are slidable within grooves formed in the inner face of the housing 98 and also through notches formed in the periphery of the rings 93 and 94 of the devices 90′ and 91′. The rods 121 extend rearwardly beyond the housing 98. There are no thrust or support rods in alinement with the rods 121, as the outer friction ring 97 directly engages the main support ring 95. These several rods also pass through notches in the peripheries of the rings 96 and serve to spline them to the housing 98.

This main-support ring 95 is provided with a suitable number of pockets 122, receiving compressible coil spring 123, held within pockets 124, formed in an annular flange 125, cast upon the housing 98.

It is thus seen that means are provided whereby a yielding supporting action of the main support ring 95 will be transmitted to the friction rings of the several friction devices 90′, 91′, and 92′, and also means is provided whereby the compress ring of each of these devices may be moved forwardly, for effecting proper frictional engagement between the friction rings.

Returning now to Figure 1ᴮ, it will be seen that the intermediate tubular hub 20, is integral with a circular disk or cam carrier 126, and this carrier is provided at its periphery with an annular flange 127, provided upon its forward face with four push cams 128, preferably integral therewith. Each push cam has a straight intermediate raised face 129, and inclined faces 130, which lead to the same.

The tubular hub 18 also has a circular disk or cam carrier 131, integral therewith, and operating within the flange 127, in concentric relation thereto. The carrier 131 is provided upon its forward face and near its periphery with push cams 132, having flat elevated faces 133, and inclined faces 134 leading thereto.

I preferably employ four cams in each set, corresponding to the number of push rods in each set. The two sets of cams move in circular concentric spaced paths, and the two sets of push rods are also grouped in spaced concentric paths.

The hub 20 may be turned in either direction by means of a crank 135, rigidly connected therewith, receiving its movement from any suitable means. The hub 18 is turned by a crank 136, receiving its movement from any suitable means.

The operation of the gearing is as follows:

Assuming that the two cranks 135 and 136 are in the neutral vertical position, then the cams 128 and 132 will occupy the neutral position between the ends of the push rods 104 and 115, 116 and 121 respectively. The rotation of the shaft 13 will be imparted to the gear 88, and since all of the friction clutch devices 90′, 91′ and 92′ are idle, the planetary gears 77 to 80 inclusive are free to rotate upon their axes, driving the sun-gears 81 to 87, upon their axes, in opposite directions. Hence the parts of the differential will spin idle and the carrier 55 will not turn upon its axis, and no rotation will be transmitted to the driven member 22. Now if the crank 136, controlling the action of the rear differential gearing unit is turned one step, so that the cams 132 depress the rods 116 of the friction clutch device 90′, then this friction clutch device is rendered active, and the disk 90 will not turn upon its axis. This will hold the tubular hub 85 against rotation upon its axis, which will in turn hold the sun-gear 87 against such turning movement. The gear 88 rotates the planetary gear 80 upon its axis, rotating the gear 79 upon its axis. This gear 79 is therefore caused to travel bodily around the gear 87, and hence the planetary carrier 55 will be rotated. As the gear 87 is of the largest diameter, the carrier 55 would be rotated at the maximum speed of the differential unit 54. The rotation of the carrier 55 will rotate the tubular hub 34, and this tubular hub will drive the gear 33, rotating the planetary gear 32, and its associated gears upon their axes, provided all of the clutch devices 57' to 67' are inactive. Now if the lever 135, controlling the action of the forward differential gearing unit is turned clock-wise for one step, the push rods 104 will be depressed and the clutch device 57' rendered active, holding the disk 57 against rotation. This disk will hold the tubular hub 36 against rotation, and the sun-gear 35 carried thereby, is held against rotation. The planetary gear 31 is now caused to travel bodily around the sun-gear 35, and the carrier 16 is rotated upon its axis, which rotation is transmitted to the driven member 22. As the gear 31 has the largest diameter of the remaining planetary gears, the forward planetary gear unit is driven at its maximum speed. It is thus seen that the gearing will not produce the maximum speed. Retaining the maximum speed in the rear planetary gear unit, such speed may be varied by selecting and holding any of the sun gears 35, 38, 37, 40 and 47 against rotation. Since there are three possible speeds obtainable from the rear planetary gear unit, and since there are six possible speeds obtainable from the front planetary gear unit, it is apparent that by properly adjusting the cranks or levers 136 and 135, that eighteen different speed combinations are obtainable.

The invention has been described as employing the shaft 13 as the driving element, and the element 22 as the driven element. While this is the preferred operation of the invention, it is obvious that the same is in no sense restricted to this manner of driving, as the operation may be reversed, and the element 22 become the driving element and the shaft 13 the driven element. This is a matter well within the expected skill of the trade.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, what I claim is:

1. In transmission gearing, a planetary gear unit embodying a rotatable carrier and a plurality of planetary gears of different diameters, said planetary gears being rotatable upon their axes as a unit, sun gears engaging certain of the planetary gears, driving means to turn the planetary gears upon their axes, control devices adapted to hold the sun gears against turning movement upon their axes, a second planetary gear unit embodying a rotatable carrier, a plurality of planetary gears of different diameters which rotate as a unit upon their axes, and sun gears engaging certain of such planetary gears, control devices for holding the sun gears of the second named planetary gear unit against turning movement upon their axes, driving connecting means between one planetary gear of the second unit and the carrier of the first unit, a set of movable rods for actuating the control devices of the first unit, a set of movable rods for actuating the control devices of the second unit, said sets of rods having their ends arranged near each other, a pair of pivoted disks arranged in close relation and near the ends of the two sets of rods, cams carried by one disk to engage and move the rods in one set, cams carried by the other disk to engage and move the rods in the other set, and means to turn the disks.

2. In transmission gearing, a plurality of planetary gear units arranged in end to end relation, each unit embodying a rotatable carrier, a plurality of planetary gears of different diameters secured to the carrier, a plurality of sun gears of different diameters corresponding in arrangement to and engaging the planetary gears, means whereby one planetary gear unit is driven by a movable part of the other planetary gear unit, a set of control devices for holding the sun gears of one unit against turning movement upon their axes, a second set of control devices for holding the sun gears of the other unit against turning movement upon their axes, a set of movable rods to control the action of the first named set of control devices and extending longitudinally of the gearing, a second set of movable rods for controlling the action of the second set of control devices and extending longitudinally of the gearing, and means arranged near one end of the gearing for actuating the first and second named sets of rods.

3. In transmission gearing, a plurality of planetary gear units, each unit embodying a rotatable carrier, a plurality of planetary gears of different diameters secured to the carrier, a plurality of sun gears of different diameters corresponding in arrangement to and engaging the planetary gears; means whereby one planetary gear unit is driven by a movable part of the other planetary gear unit; selective control means for holding the sun gears of one unit against turning movement upon their axes including a set of movable rods; selective control means for controlling the turning movement of the sun gears of the other unit upon their axes including a set of movable rods; a pair of movable elements arranged in close relation; cams carried by one movable element to actuate one set of rods; cams carried by the other movable element to actuate the other set of rods; and means to move the elements independently.

4. In transmission gearing, a planetary gear embodying a rotatable carrier, a plurality of planetary gears of different diameters secured to the carrier and rotatable upon their axes as a unit, a plurality of sun gears of different diameters corresponding in number and arrangement to the planetary gears and engaging therewith, the sun gears being independently rotatable upon their axes, a corresponding number of control devices connected with the sun gears to hold them against turning movement upon their axes embodying separate friction clutch devices, yielding means arranged near the friction clutch devices, means whereby the action of the yielding means is transmitted separately to the friction clutch devices, separate compress rods having operative engagement with the corresponding friction clutch devices, and selective means to move the compress rods in one direction.

5. In transmission gearing, a planetary gear embodying a rotatable carrier, a plurality of planetary gears of different diameters secured to the carrier and rotatable upon their axes as a unit, a plurality of sun gears of different diameters corresponding in number and arrangement to the planetary gears and engaging therewith, the sun gears being independently rotatable upon their axes with relation to each other, a plurality of disks corresponding in number to the sun gears and connected therewith to control the rotation of the same, a stationary support extending about the disks, a friction clutch device for each disk, each friction clutch device including a friction clutch element splined upon the periphery of the disk and a coacting friction clutch element splined to the stationary support, yielding means, means whereby the action of the yielding means is transmitted separately to the several friction clutch devices, movable rod means engaging each friction clutch device, and selective means to actuate the several movable rod means.

6. In transmission gearing, a shaft, a planetary gear mounted upon the shaft embodying a rotatable carrier, a plurality of planetary gears of different diameters connected with the carrier, a plurality of sun gears of different diameters engaging the planetary gears and surrounding the shaft in concentric relation thereto, telescoping tubular hubs connected with the sun gears and surrounding the shaft in concentric relation, a plurality of disks mounted upon the tubular hubs in concentric relation to said shaft, friction clutch devices surrounding the disks at their peripheries for controlling the rotation of the same, a plurality of push rods associated with the friction clutch devices to render the same active, a pivoted member having cams to depress the push rods whereby a selected clutch device may be rendered active, means to drive the planetary gears upon their axes, and a driven member connected with the carrier.

7. In transmission gearing, a casing, a shaft within the casing, a planetary gear mounted upon the shaft embodying a rotatable carrier, a plurality of planetary gears of different diameters connected with the carrier, a plurality of sun gears of different diameters engaging the planetary gears and supported by said shaft, a plurality of disks corresponding in number to the sun gears and connected with the same for rotation therewith, friction clutch devices surrounding the disks at their peripheries and corresponding in number therewith, each friction clutch device embodying a friction element splined to the periphery of the corresponding disk, push rods serving to render the friction clutch devices active and also serving to spline certain friction elements thereof with the casing, a pivoted carrier, and cams mounted upon the pivoted carrier for depressing selected push rods.

8. In transmission gearing, a casing, a shaft within the casing, a planetary gear mounted upon the shaft embodying a rotatable carrier, a plurality of planetary gears of different diameters connected with the carrier, a plurality of sun gears of different diameters engaging the planetary gears and supported by the shaft, a plurality of disks corresponding in number to the sun gears and connected with the same for rotation therewith, friction clutch devices surrounding the disks and corresponding in number thereto, each friction clutch device embodying a friction element splined to the adjacent disk and a coacting friction element, push rods to render the clutch devices active and serving to spline the coacting elements to the casing, yielding means, rods for transmitting the action of the yielding means to the friction clutch devices and also serving to spline said coacting elements to the casing, a pivoted carrier, cams carried thereby to depress selected push rods, means for turning the planetary gears upon their axes, and a driven element connected with the carrier.

9. In transmission gearing, a casing, a driving shaft extending therethrough, a planetary gear unit mounted upon the driving shaft and including a carrier rotatable about said shaft, a plurality of planetary gears of different diameters mounted upon the carrier and rotatable at its unit, a gear rotatable with the driving shaft and engaging one planetary gear, a plurality of tubular hubs arranged in telescoping relation with the innermost tubular hub rotatable upon the driving shaft, sun gears of different diameters carried by the tubular hubs and engaging the planetary gears, a corresponding number of disks mounted upon the tubular hubs for rotation therewith, friction clutch devices corresponding in number to the disks for controlling the turning movement of the same, means including a circular group of push rods for rendering the friction clutch devices active, means for depressing selected push rods, a tubular hub rotatable upon the driving shaft and connected with the carrier for rotation therewith, a second differential gear unit mounted upon the driving shaft and embodying a carrier rotatable thereon, a plurality of differential gears secured to the carrier and having different diameters, a plurality of sun gears of different diameters engaging the last named planetary gears, one of the last named sun gears being carried by the last named tubular hub, a plurality of telescoping tubular hubs carrying the remaining last named sun gears with the innermost tubular hub rotatable upon said last named tubular hub, a corresponding number of disks mounted upon the last named telescoping tubular hubs for controlling their rotation, a corresponding number of friction clutch devices for controlling the rotation of the last named disks, means including a circular group of push rods for rendering the last named friction clutch devices active, the last named circular group of push rods being disposed in concentric relation to the first named circular group of push rods, and spaced therefrom, and means for depressing selected push rods in the last named circular group.

In testimony whereof I affix my signature.

JOHN E. BECKMAN.